United States Patent [19]
Kato

[11] Patent Number: 5,825,805
[45] Date of Patent: Oct. 20, 1998

[54] SPREAD SPECTRUM COMMUNICATION SYSTEM

[75] Inventor: Ichiro Kato, Kawasaki, Japan

[73] Assignee: Canon, Tokyo, Japan

[21] Appl. No.: 249,685

[22] Filed: May 26, 1994

Related U.S. Application Data

[63] Continuation of Ser. No. 967,153, Oct. 27, 1992.

[30] Foreign Application Priority Data

Oct. 29, 1991 [JP] Japan .................................. 3-309694
Oct. 29, 1991 [JP] Japan .................................. 3-309695

[51] Int. Cl.$^6$ .............................. H04B 1/66; H04K 1/00; H04L 22/32
[52] U.S. Cl. ........................... 375/200; 375/316; 375/295
[58] Field of Search ................................... 375/200, 201, 375/202, 206, 207, 208, 316, 340, 295; 327/106; 370/209

[56] References Cited

U.S. PATENT DOCUMENTS

| | | | |
|---|---|---|---|
| 3,747,024 | 7/1973 | Choquet et al. | 332/104 |
| 3,969,617 | 7/1976 | Fontanes | 332/119 X |
| 3,988,607 | 10/1976 | Eggermont et al. | 364/724.1 |
| 3,997,773 | 12/1976 | Van Essen et al. | 364/723 |
| 4,306,222 | 12/1981 | Peek et al. | 341/118 |
| 4,452,642 | 6/1984 | Moses et al. | 370/76 |
| 4,581,750 | 4/1986 | Dieleman | 375/55 |
| 4,635,274 | 1/1987 | Kubota et al. | 375/1 |
| 4,660,216 | 4/1987 | Claasen et al. | 375/58 |
| 4,672,629 | 6/1987 | Beier | 375/1 |
| 4,672,633 | 6/1987 | Claasen et al. | 375/58 |
| 4,771,335 | 9/1988 | Obara | 370/77 |
| 4,837,812 | 6/1989 | Takahashi et al. | 379/98 |
| 4,843,613 | 6/1989 | Crowle | 375/59 |
| 4,860,115 | 8/1989 | Ogura | 358/443 |
| 5,111,478 | 5/1992 | McDonald | 375/200 |
| 5,144,641 | 9/1992 | Akazawa et al. | 375/208 |
| 5,155,741 | 10/1992 | Waters et al. | 375/200 |
| 5,170,411 | 12/1992 | Ishigaki | 375/200 |
| 5,177,767 | 1/1993 | Kato | 375/1 |
| 5,204,877 | 4/1993 | Endo et al. | 375/1 |
| 5,329,549 | 7/1994 | Kawasaki | 375/200 |

FOREIGN PATENT DOCUMENTS

| | | |
|---|---|---|
| 49-25808 | 3/1974 | Japan . |
| 1114762 | 5/1989 | Japan ........................ G01R 19/165 |
| 3-220830 | 9/1991 | Japan . |
| 2200510 | 8/1988 | United Kingdom ............ H04N 1/32 |

OTHER PUBLICATIONS

Office Action dated Jun. 4, 1996 of Japanese Patent Application No. 2–56133 (corresponding to U.S. Patent No. 5,177,767, of record).

Primary Examiner—Tesfaldet Bocure
Assistant Examiner—Bryan Webster
Attorney, Agent, or Firm—Morgan & Finnegan LLP

[57] ABSTRACT

Digital data for generating a signal having a prescribed waveform is stored beforehand in the memory on the transmitting side of a communication system. The prescribed waveform is one obtained by combining signals having mutually different frequencies corresponding to the digits of a spread-spectrum code comprising a plurality of digits. When transmission data is inputted, the system generates, for every bit of data, a signal waveform corresponding to the value of the bit, based upon the data stored in the memory. The generated signal is a signal which has undergone spreading. This signal is placed upon a carrier wave and then sent to a transmission line. Like the transmitting side, the receiving side possesses digital data for generating a signal having a prescribed waveform. When a signal is received, the system generates a signal based upon the data possessed, multiplies this by the received signal and effects a conversion into a signal having an intermediate frequency. Signals in a prescribed frequency band are filtered out of the intermediate frequency and data is demodulated from the filtered signal.

53 Claims, 20 Drawing Sheets

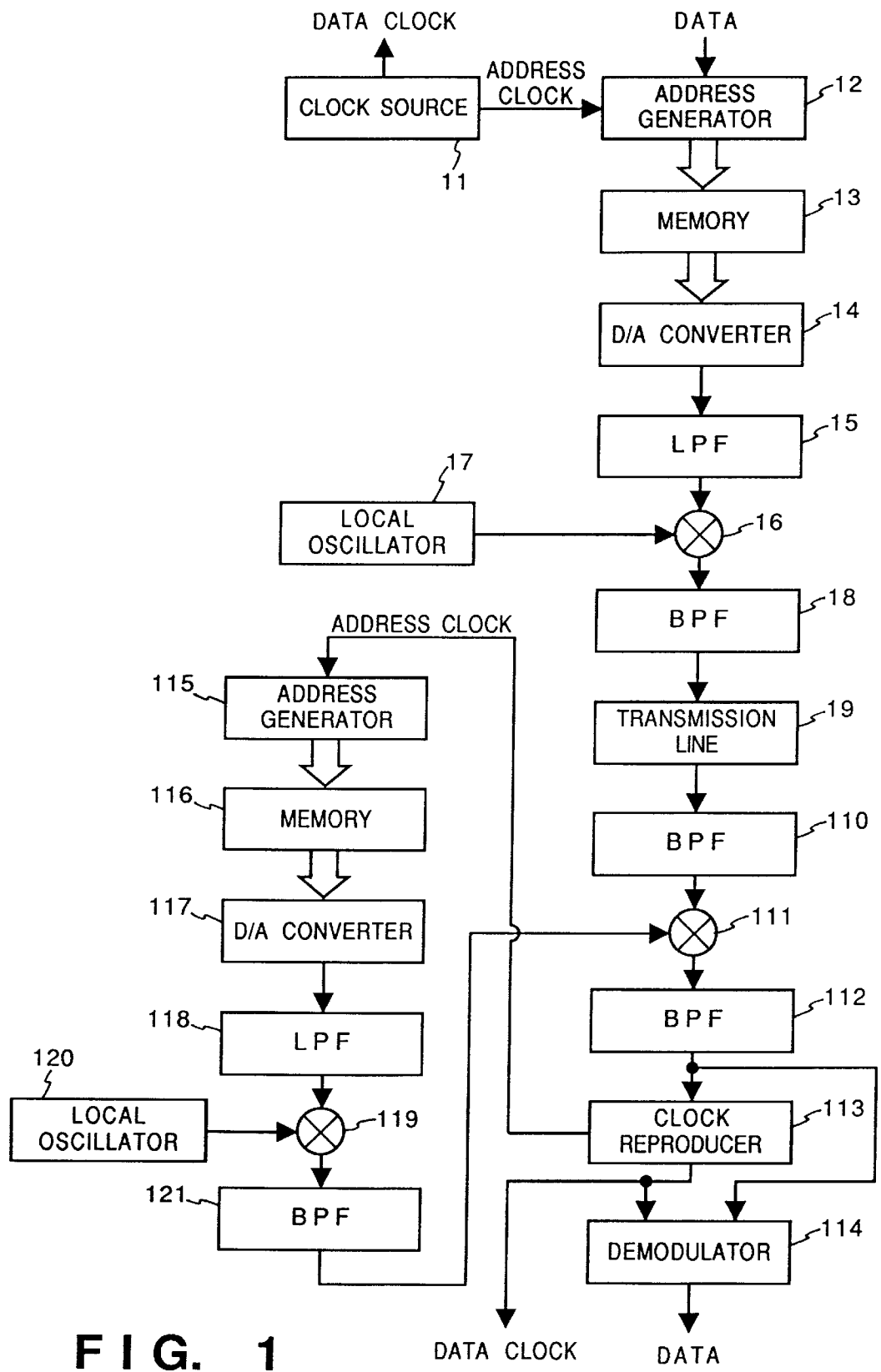
F I G. 1

| ADDRESS | DATA |
|---|---|
| 0 | $\sum_{i=0}^{n-1} \cos[2\pi\{4(p+i)+2Ci'\}fd \cdot 0/mfd]$ |
| 1 | $\sum_{i=0}^{n-1} \cos[2\pi\{4(p+i)+2Ci'\}fd \cdot 1/mfd]$ |
| ... | ... |
| m-1 | $\sum_{i=0}^{n-1} \cos[2\pi\{4(p+i)+2Ci'\}fd \cdot (m-1)/mfd]$ |

FIG. 3

| ADDRESS | DATA |
|---|---|
| 0 | $\sum_{i=0}^{n-1} \cos[2\pi\{4(p+i)+2Ci\}fd \cdot 0/mfd]$ |
| 1 | $\sum_{i=0}^{n-1} \cos[2\pi\{4(p+i)+2Ci\}fd \cdot 1/mfd]$ |
| ... | ... |
| m−1 | $\sum_{i=0}^{n-1} \cos[2\pi\{4(p+i)+2Ci\}fd \cdot (m-1)/mfd]$ |
| m | $(-1)\sum_{i=0}^{n-1} \cos[2\pi\{4(p+i)+2Ci\}fd \cdot 0/mfd]$ |
| m+1 | $(-1)\sum_{i=0}^{n-1} \cos[2\pi\{4(p+i)+2Ci\}fd \cdot 1/mfd]$ |
| ... | ... |
| 2m−1 | $(-1)\sum_{i=0}^{n-1} \cos[2\pi\{4(p+i)+2Ci\}fd \cdot (m-1)/mfd]$ |

FIG. 4

| NUMBER | ARITHMETIC EXPRESSION |
|---|---|
| EXPRESSION 1 | $d(t) \sum_{i=0}^{n-1} \cos[2\pi\{4(p+i)+2Ci\}fd \cdot t]$ WHERE $d(t) = 1$ OR $-1$ |
| EXPRESSION 2 | $d(t) \sum_{i=0}^{n-1} \cos[2\pi\{fc+[4(p+i)+2Ci]fd\}t]$ |
| EXPRESSION 3 | $\sum_{i=0}^{n-1} \cos[2\pi\{4(p+i)+2Ci'\}fd \cdot t]$ |
| EXPRESSION 4 | $\sum_{i=0}^{n-1} \cos[2\pi\{fc'+[4(p+i)+2Ci']fd\}t]$ |
| EXPRESSION 5 | $1/2 \cdot d(t) \sum_{i=0}^{n-1} \sum_{j=0}^{n-1} [\cos 2\pi\{fc+fc'+[4(2p+i+j)+2Ci+2Cj']fd\}t + \cos 2\pi\{f_{IF}+[4(i-j)+2(Ci-Cj')]fd\}t]$ |
| EXPRESSION 6 | $1/2 \cdot d(t) \sum_{i=0}^{n-1} [\cos 2\pi\{f_{IF}+2(Ci-Ci')fd\}t$ $(n \cdot 1/2 \cdot d(t) \cos 2\pi f_{IF} t$ WHERE $Ci = Ci'$ $(i = 0, n-1))$ |

FIG. 5

| ADDRESS | DATA |
|---------|------|
| 0 | $\sum_{i=0}^{n-1} Ci' \cos\{2\pi(p+i) \cdot 2fd \cdot 0 / mfd\}$ |
| 1 | $\sum_{i=0}^{n-1} Ci' \cos\{2\pi(p+i) \cdot 2fd \cdot 1 / mfd\}$ |
| ... | ... |
| m-1 | $\sum_{i=0}^{n-1} Ci' \cos\{2\pi(p+i) \cdot 2fd \cdot (m-1) / mfd\}$ |

FIG. 7

| ADDRESS | DATA |
|---|---|
| 0 | $\sum_{i=0}^{n-1} C_i \cos\{2\pi(p+i) \cdot 2fd \cdot 0/mfd\}$ |
| 1 | $\sum_{i=0}^{n-1} C_i \cos\{2\pi(p+i) \cdot 2fd \cdot 1/mfd\}$ |
| ... | ... |
| m − 1 | $\sum_{i=0}^{n-1} C_i \cos\{2\pi(p+i) \cdot 2fd \cdot (m-1)/mfd\}$ |
| m | $(-1)\sum_{i=0}^{n-1} C_i \cos\{2\pi(p+i) \cdot 2fd \cdot 0/mfd\}$ |
| m + 1 | $(-1)\sum_{i=0}^{n-1} C_i \cos\{2\pi(p+i) \cdot 2fd \cdot 1/mfd\}$ |
| ... | ... |
| 2m − 1 | $(-1)\sum_{i=0}^{n-1} C_i \cos\{2\pi(p+i) \cdot 2fd \cdot (m-1)/mfd\}$ |

FIG. 8

| NUMBER | ARITHMETIC EXPRESSION |
|---|---|
| EXPRESSION 11 | $d(t) \sum_{i=0}^{n-1} C_i \cos\{2\pi(p+i) \cdot 2fd \cdot t\}$ WHERE $d(t) = 1$ OR $-1$ |
| EXPRESSION 12 | $d(t) \sum_{i=0}^{n-1} C_i \cos[2\pi\{fc + (p+i) \cdot 2fd\} t]$ |
| EXPRESSION 13 | $\sum_{i=0}^{n-1} C_i' \cos[2\pi\{p+i) \cdot 2fd\} t]$ |
| EXPRESSION 14 | $\sum_{i=0}^{n-1} C_i' \cos[2\pi\{fc' + (p+i) \cdot 2fd\} t]$ |
| EXPRESSION 15 | $1/2 \cdot d(t) \sum_{i=0}^{n-1} \sum_{j=0}^{n-1} [C_i C_j' \cos[2\pi\{fc + fc' + (2p+i+j) 2fd\} t] + C_i C_j' \cos 2\pi\{f_{IF} + (i-j) 2fc\} t]$ |
| EXPRESSION 16 | $1/2 \cdot d(t) \sum_{i=0}^{n-1} C_i C_i' \cos 2\pi f_{IF} t$ WHERE $C_i = C_i'$ $(i = 0, n-1)$ $(n \cdot 1/2 \cdot d(t) \cos 2\pi f_{IF} t$ WHERE $C_i = C_i'$ $(i = 0, n-1))$ |

FIG. 9

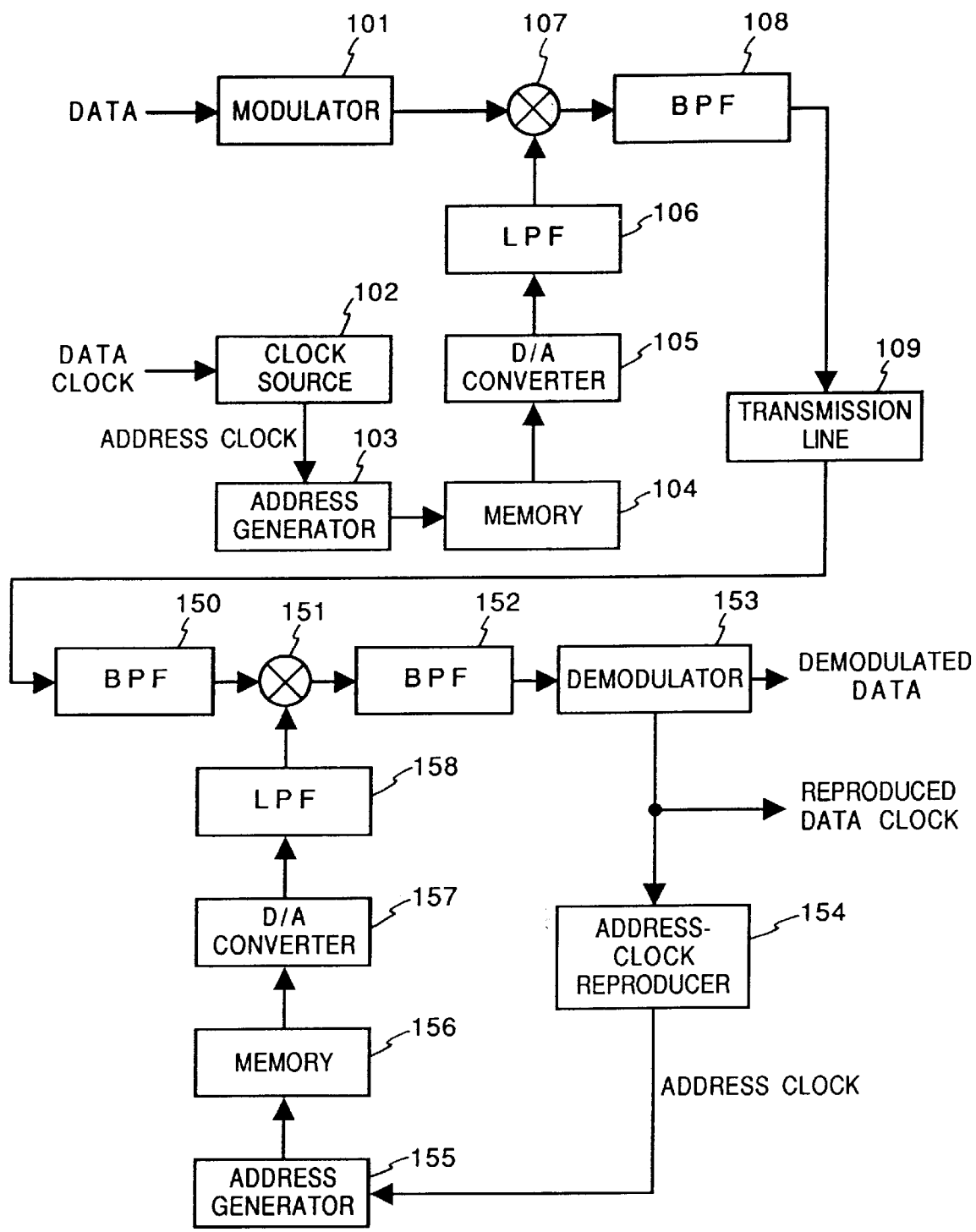
F I G. 12

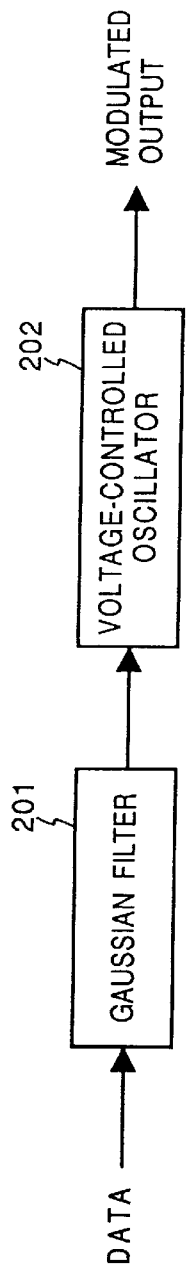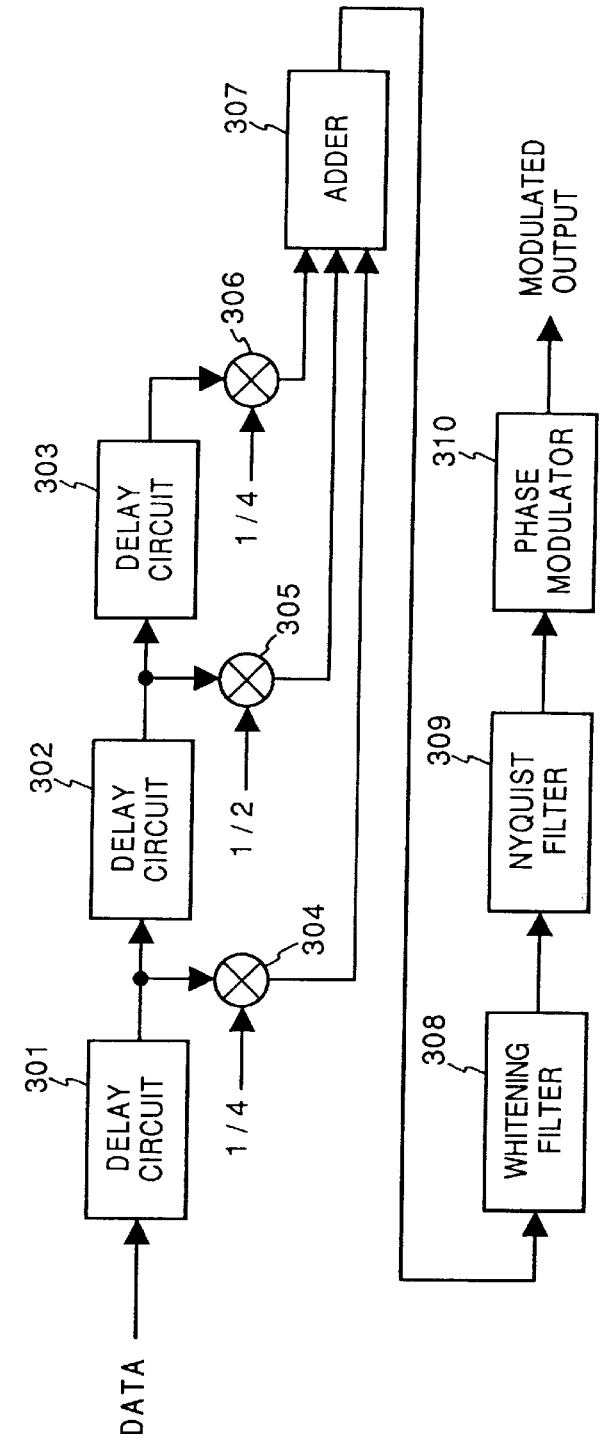
FIG. 13
FIG. 14

| ADDRESS | DATA |
|---|---|
| 0 | $\sum_{i=0}^{n-1} C_i \cos\{2\pi(p+i) \cdot 2fd \cdot 0/mfd\}$ |
| 1 | $\sum_{i=0}^{n-1} C_i \cos\{2\pi(p+i) \cdot 2fd \cdot 1/mfd\}$ |
| ... | ... |
| m-1 | $\sum_{i=0}^{n-1} C_i \cos\{2\pi(p+i) \cdot 2fd \cdot (m-1)/mfd\}$ |

FIG. 15

| ADDRESS | DATA |
|---|---|
| 0 | $\sum_{i=0}^{n-1} Ci' \cos\{2\pi(p+i) \cdot 2fd \cdot 0/mfd\}$ |
| 1 | $\sum_{i=0}^{n-1} Ci' \cos\{2\pi(p+i) \cdot 2fd \cdot 1/mfd\}$ |
| ... | ... |
| m-1 | $\sum_{i=0}^{n-1} Ci' \cos\{2\pi(p+i) \cdot 2fd \cdot (m-1)/mfd\}$ |

F I G. 16

| NUMBER | ARITHMETIC EXPRESSION |
|---|---|
| EXPRESSION 21 | $\sum_{i=0}^{n-1} C_i \cos\{2\pi(p+i)\cdot 2fd \cdot t\}$ |
| EXPRESSION 22 | $1/2 \cdot S(t) \sum_{i=0}^{n-1} C_i \cos 2\pi\{fc+(p+i)\cdot 2fd\}t$ |
| EXPRESSION 23 | $\sum_{i=0}^{n-1} C_i' \cos\{2\pi(p+i)\cdot 2fd \cdot t\}$ |
| EXPRESSION 24 | $1/4 \cdot S(t) \sum_{i=0}^{n-1} \sum_{j=0}^{n-1} [C_i C_j' \cos 2\pi\{fc+(2p+i+j)\cdot 2fd\}t + C_i C_j' \cos 2\pi\{fc+(i-j)\cdot 2fd\}t]$ |
| EXPRESSION 25 | $1/4 \cdot S(t) \sum_{i=0}^{n-1} C_i C_i' \cos 2\pi fc\, t$<br>$(n \cdot 1/4 \cdot S(t) \cos 2\pi fc\, t \text{ WHERE } C_i = C_i' \,(i=0, n-1))$ |

FIG. 17

| ADDRESS | DATA |
|---------|------|
| 0 | $\sum_{i=0}^{n-1} \cos[2\pi\{4(p+i)+2C_i\} fd \cdot 0/mfd]$ |
| 1 | $\sum_{i=0}^{n-1} \cos[2\pi\{4(p+i)+2C_i\} fd \cdot 1/mfd]$ |
| ... | ... |
| m-1 | $\sum_{i=0}^{n-1} \cos[2\pi\{4(p+i)+2C_i\} fd \cdot (m-1)/mfd]$ |

FIG. 18

| ADDRESS | DATA |
|---|---|
| 0 | $\sum_{i=0}^{n-1} \cos[2\pi\{4(p+i)+2Ci'\}fd \cdot 0/mfd]$ |
| 1 | $\sum_{i=0}^{n-1} \cos[2\pi\{4(p+i)+2Ci'\}fd \cdot 1/mfd]$ |
| ... | ... |
| m-1 | $\sum_{i=0}^{n-1} \cos[2\pi\{4(p+i)+2Ci'\}fd \cdot (m-1)/mfd]$ |

FIG. 19

| NUMBER | ARITHMETIC EXPRESSION |
|---|---|
| EXPRESSION 31 | $\sum_{i=0}^{n-1} \cos[2\pi\{4(p+i)+2Ci\}fd \cdot t]$ |
| EXPRESSION 32 | $1/2 \cdot S(t) \sum_{i=0}^{n-1} \cos 2\pi[fc+\{4(p+i)+2Ci\}fd]t$ |
| EXPRESSION 33 | $\sum_{i=0}^{n-1} \cos[2\pi\{4(p+i)+2Ci'\}fd \cdot t]$ |
| EXPRESSION 34 | $1/4 \cdot S(t) \sum_{i=0}^{n-1}\sum_{j=0}^{n-1}[\cos 2\pi\{fc+[4(2p+i+j)+2Ci+2Cj']\}t + \cos 2\pi\{fc+[4(i-j)+2(Ci-Cj')]fd\}t]$ |
| EXPRESSION 35 | $1/4 \cdot S(t) \sum_{i=0}^{n-1} \cos 2\pi\{fc+2(Ci-Ci')fd\}t$ $(n \cdot 1/4 \cdot S(t) \cos 2\pi fc\,t \text{ WHERE } Ci=Ci'\,(i=0, n-1))$ |

FIG. 20

SPREAD SPECTRUM COMMUNICATION SYSTEM

This is a continuation of co-pending application Ser. No. 07/967,153, filed on Oct. 27,1992.

BACKGROUND OF THE INVENTION

1. Field of the Invention

This invention relates to a spread-spectrum communication system in which, when information is transmitted by wire or wirelessly, the information is converted into a signal having a bandwidth much greater than that of the information band.

2. Description of the Prior Art

A spread-spectrum communication system is one in which information data is transmitted as a signal whose bandwidth is much larger than that of the data. Broadly classified, two methods are available in the prior art for achieving such communication.

One method is a so-called direct-sequence (DS) method. In this method, the transmitting side multiplies a digitized baseband signal by a spread-spectrum code such as a high-speed pseudorandom noise code to generate a baseband signal having a bandwidth much greater than that of the original data. This signal is modulated as by phase-shift keying (PSK) or frequency-shift keying (FSK) to be converted into a radio-frequency (RF) signal before being transmitted. On the receiving side, a spread-spectrum code the same as that on the transmitting side is used to perform reverse spreading, which is for establishing correlation with the received signal. Thus, demodulation is performed to obtain the original data.

The second method is referred to as so-called frequency hopping (FH). In this method, the transmitting side performs transmission by changing over the frequency of a carrier wave, which has been modulated by a baseband signal, at a time interval of one data bit, or at a time interval which is a whole-number fraction or a whole-number multiple thereof, in accordance with a spread-spectrum code. On the receiving side, demodulation is performed to obtain the original data by carrying out reverse spreading. This is accomplished by performing a correlating operation, in which the carrier wave on the receiving side is brought in tune with the transmitting side by using a spread-spectrum code the same as that on the transmitting side.

In order to achieve correct correlation on the receiving side in these systems, it is necessary for the spread-spectrum code on the transmitting side and that on the receiving side to be synchronized accurately. In the prior art, synchronizing circuits for achieving accurate synchronization employ a so-called sliding correlation loop.

FIG. 21 is a block diagram illustrating a sliding correlation loop for the DS method.

As shown in FIG. 21, a received spread-spectrum signal enters a mixer 401, which multiplies this input by a spread-spectrum code sequence generated by a spread-spectrum code generator 406. The output of the mixer 401 enters a band-pass filter (BPF) 402 having a bandwidth corresponding to the original data. The output of the BPF 402 enters a detector circuit 403, which subjects this input signal to envelope detection. The output of the detector circuit 403 is smoothened by a low-pass filter (LPF) 404.

If autocorrelation is achieved, the reverse-spread signal is obtained as the output of the mixer 401, and the obtained signal passes through the BPF 402 and has its envelope detected by the detector circuit 403. The output signal of the detector circuit 403 enters the LPF 404, which proceeds to smoothen the signal to obtain a DC level.

If autocorrelation is not achieved, a reverse-spread signal is not obtained at the output of mixer 401, and therefore almost all of the power of the received spread-spectrum signal is blocked by the BPF 402. The output of the BPF 402 is subjected to envelope detection by the detector circuit 403, whose output signal is smoothened by the LPF 404. However, the DC level obtained as the output is sufficiently small in comparison with the case in which autocorrelation is obtained.

The DC-level output of the LPF 404 is supplied to a voltage-controlled oscillator (VCO) 405. Since the output of the LPF 404 has a sufficiently small DC level when autocorrelation is not achieved, a signal whose frequency is somewhat different from that of the spread-spectrum code contained in the received spread-spectrum signal is obtained as the output of VCO 405. This signal is supplied to the spread-spectrum code generator 406 as a clock signal. Since the speed of the clock of the spread-spectrum code generated by the spread-spectrum code generator 406 is offset slightly from the clock speed of the received spread-spectrum signal, the phases of the two signals gradually become displaced from each other. As a result, by the time the two phases shift by an amount equivalent to one period of the spread-spectrum code, coincidence is achieved and autocorrelation is obtained. When this occurs, the DC output level of the LPF 404 rises, the oscillation frequency of the VCO 405 is locked to the present frequency and synchronization is achieved between the spread-spectrum code generated by the spread-spectrum code generator 406 and the reverse spread-spectrum code. In accordance with this method, the time needed to obtain synchronization generally is very long since the phase of the reverse spread-spectrum code is shifted only in gradual fashion to synchronize the code.

FIG. 22 is a block diagram which illustrates a sliding correlation loop for the FH method. The construction of the loop in FIG. 22 is similar to that of FIG. 21 except that a frequency synthesizer 507 is added.

In FIG. 22, the output signal of the synthesizer 507 is changed in accordance with the spread-spectrum code sequence which enters from the code generator 506. A mixer 501 multiplies the output signal of the synthesizer 501 and the received spread-spectrum signal together. If the spread-spectrum code on the receiving side is in synchronism with that on the transmitting side, a signal whose frequency band is the same as that of the signal prior to spreading is obtained as the output of the mixer 501. Operations performed by a BPF 502, detector circuit 503, LPF 504, VCO 505 and the code-sequence generator 506 are the same as in the case of the DS method.

Thus, in conventional spread-spectrum communication systems, the spread-spectrum code is varied along a time axis. This means that circuitry for achieving spread-spectrum code synchronization is required, and that the time needed for achieving such synchronization by this circuitry is very long. These are some of the drawbacks encountered in the prior art.

SUMMARY OF THE INVENTION

An object of the present invention is to provide a spread-spectrum communication system in which the spread-spectrum code is developed along a frequency axis, whereby a spread-spectrum code synchronizing circuit for varying the spread-spectrum code along the time axis may be dispensed with and temporal overhead at the time of initial information demodulation for spread-spectrum synchronization is eliminated to make possible high-speed initial synchronization.

Another object of the invention is to provide a spread-spectrum communication system in which highly reliable communication can be realized since it is unnecessary to re-acquire synchronization between the sending and receiving sides.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the configuration of a first embodiment of the present invention;

FIG. 3 is a table showing the content of data in a memory on a receiving side in the first embodiment;

FIG. 4 is a table showing the content of data in a memory on a transmitting side in the first embodiment;

FIG. 5 is a table showing a list of arithmetic expressions used in the description of the first embodiment;

FIG. 7 is a table showing the content of data in a memory on a receiving side in the third embodiment;

FIG. 8 is a table showing the content of data in a memory on a transmitting side in the third embodiment;

FIG. 9 is a table showing a list of arithmetic expressions used in the description of the third embodiment;

FIG. 12 is a block diagram showing the configuration of a fifth embodiment of the present invention;

FIG. 13 is a block diagram showing the construction of a modulator according to the fifth embodiment;

FIG. 14 is a block diagram showing the construction of a modulator according to the sixth embodiment;

FIG. 15 is a table showing the content of data in a memory on a transmitting side in the fifth embodiment;

FIG. 16 is a table showing the content of data in a memory on a receiving side in the fifth embodiment;

FIG. 17 is a table showing a list of arithmetic expressions used in the description of the fifth embodiment;

FIG. 18 is a table showing the content of data in a memory on a transmitting side in a seventh embodiment;

FIG. 19 is a table showing the content of data in a memory on a receiving side in the seventh embodiment;

FIG. 20 is a table showing a list of arithmetic expressions used in the description of the seventh embodiment;

DESCRIPTION OF THE PREFERRED EMBODIMENTS

[First Embodiment]

FIG. 1 is a block diagram illustrating the configuration of a first embodiment of the present invention. In the system according to the first embodiment, discrete data obtained by digitizing a prescribed signal which contains a spread-spectrum code is stored in a memory in advance. When data enters from an information source, the discrete data stored in the memory is read out and converted into a prescribed signal based upon the input, a spread-spectrum signal corresponding to the input data is generated, and the data is transmitted. When a spread spectrum signal is received by this system, data obtained by digitizing a prescribed signal which contains a reverse-spread code is read out, the prescribed signal is generated from the data and the received spread-spectrum signal is subjected to reverse spreading using this prescribed signal. The first embodiment of the invention will be described in detail with reference to the drawings.

<System configuration>

As shown in FIG. 1, a clock source 11 generates a clock signal whose frequency is at least twice the maximum frequency of a signal produced based upon data stored in a memory 13. The clock signal enters an address generator 12 as an address clock. The generated clock signal from the clock source 11 also is frequency-divided and supplied to an information source as a data clock. There is a limitation, described later, upon the frequency-dividing ratio of the clock.

The address generator 12 generates an address signal from the address clock, which enters from the clock source 11, and from data that enters from the information source in synchronization with the data clock. This address signal is outputted to the memory 13.

Stored beforehand in the memory 13 is discrete data representing a prescribed signal digitized in accordance with a sampling theorem. The discrete data stored in the memory 13 is read out and outputted based upon the address signal which enters from the address generator 12.

Figure 2:
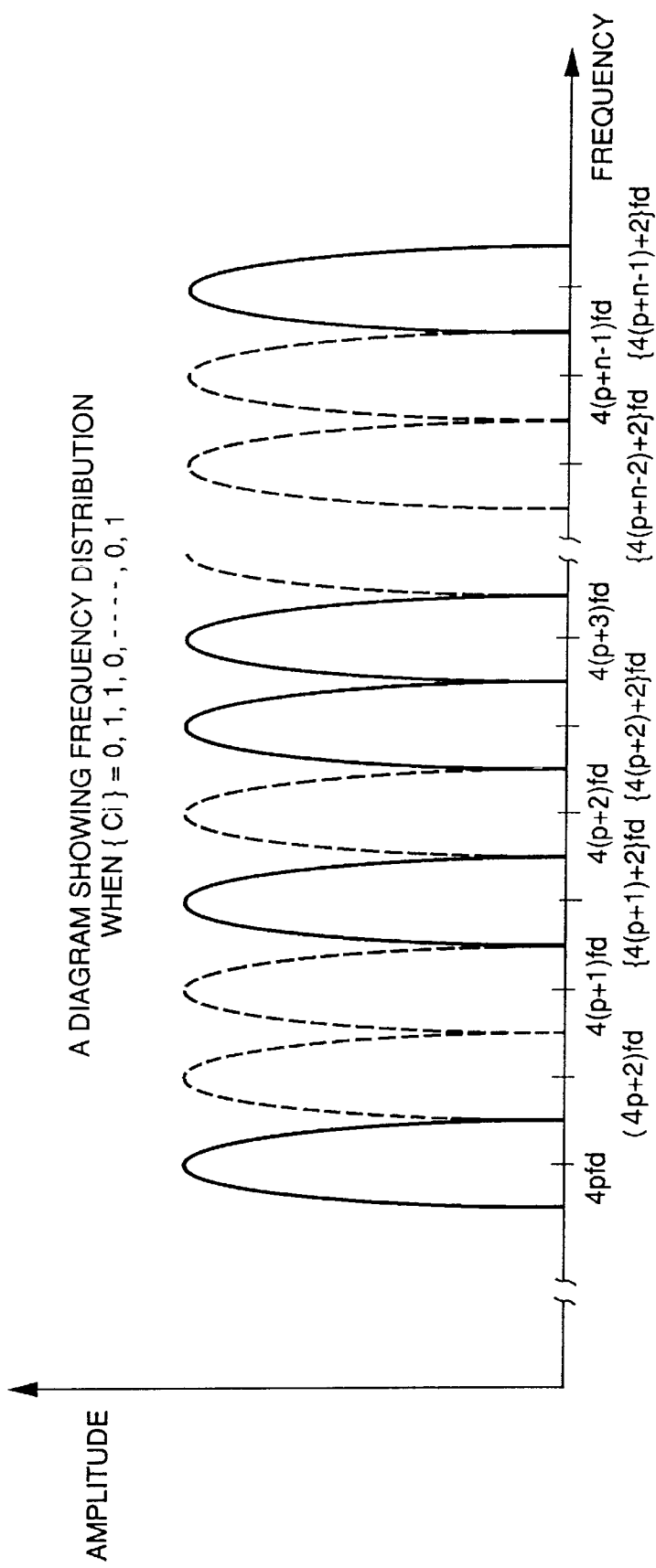
FIG. 2 is a diagram showing a frequency distribution of an analog signal based upon data stored in a memory in the first embodiment.

A D/A converter 14 subjects the output signal from the memory 13 to a D/A conversion, and a low-pass filter (LPF) 15 subjects the output signal from the D/A converter 14 to anti-aliasing and outputs a spread baseband signal. An example of an output from the LPF 15 is illustrated in FIG. 2. This output has n-number of frequency components, as shown in FIG. 2.

A mixer 16 and a local oscillator 17 convert the baseband signal outputted by the LPF 15 into a transmission band, and a band-pass filter (BPF) 18 removes signals other than that of the transmission band from the output signal of the mixer 16.

Signals which become mixed in a transmission line 19 and are outside the band are removed by a BPF 110, and a BPF 112 removes signals, which are other than those of a prescribed band, from the output of the mixer 111.

A clock reproducer 113 reproduces a data clock and an address clock from the output signal of the BPF 112, and a demodulator 114 reproduces data from the output signal of the BPF 112 and the data clock reproduced by the clock reproducer 113.

An address generator 115 generates an address from the address clock produced by the clock reproducer 113, and a memory 116 outputs signal sampling data, which has been stored in advance, based upon the address signal from the address generator 115.

A D/A converter 117 subjects the output signal from the memory 116 to a D/A conversion, and an LPF 118 subjects the output signal of the D/A converter 117 to anti-aliasing and outputs the result. A mixer 119 and a local oscillator 120 convert the baseband signal outputted by the LPF 118 into a signal having a prescribed frequency band, and a BPF 121 eliminates signals outside the prescribed frequency band from the output of the mixer 119.

<Data stored in memory 13 and memory 116>

The data stored in the memories 13 and 116 will be described in detail before discussing the operation of the system.

The data in the memory 116 on the receiving side is discrete data which expresses a prescribed signal composed of n-number of frequency components. This data is created by a sampling theorem. Reverse spread-spectrum codes C0', C1', C2', . . . Cn−1' are allocated to the n-number of frequency components beforehand, and each code has a value of 0 or 1. The reverse spread-spectrum codes are values in which C0'~Cn−1' form one set. The set of reverse spread-spectrum codes is referred to as a reverse spread-spectrum code sequence and is represented by {Ci'}.

If we let fd represent the frequency of the data clock, then the frequency components of the signal stored in the memory 116 will be represented by the following:

$$(4p+2C0')fd, \{4(p+1)+2C1'\}fd, \{4(p+2)+2C2'\}fd, \ldots, \{4(p+n-1)+2Cn-1'\}fd$$

where p is a positive integer.

The frequency of the address clock is greater than twice the maximum frequency of the above-mentioned components and is represented by mfd [m≧8 (p+n−1)+1]. The data in the memory 116 has the values shown in FIG. 3. Specifically, the memory 116 is divided into m-number of locations at addresses 0 through m−1. Data obtained in a case where a signal in which the aforesaid frequency components have been added together is sampled at a sampling rate mfd is stored in the memory locations of memory 116 in numerical order every 1/mfd from time 0.

On the transmitting side, meanwhile, two signals displaced in phase by 180° are stored in the memory 13 in order to PSK-modulate a signal by the data which enters from the information source. That is, the memory 13 is divided into 2m-number of locations. The m-number of memory locations at addresses 0 through m−1 are allocated to signals corresponding to data "0", and the m-number of memory locations at addresses m through 2m−1 are allocated to signals corresponding to data "1". For example, if an address is generated with the value of the most significant bit of the address allocated to the data, the memory locations can be simply divided into two portions in dependence upon the data. The data in memory 13 is data of the kind shown in FIG. 4. In FIG. 4, C0, C1, C2, . . ., Cn−1 represent spread-spectrum codes each having a value of 0 or 1. These are referred to collectively as a spread-spectrum code sequence, just as in the case of the reverse spread-spectrum codes.

In FIG. 4, the contents at addresses 0 through m−1 of memory 13 are the same as the contents in memory 116 shown in FIG. 3 except for the fact that the reverse spread-spectrum code sequence has been replaced by the spread-spectrum code sequence. More specifically, data obtained in a case where a signal in which frequency components (4p+2C0)fd, {4(p+1)+2C1}fd, {4(p+2)+2C2}fd, . . ., {4(p+n−1)+2Cn−1}fd have been added together is digitized at the sampling rate mfd is stored at addresses 0 through m−1 in numerical order every 1/mfd from time 0. Further, data obtained by reversing the sign of the data stored at addresses 0 through m−1 is stored at addresses m through 2m−1. Signals obtained from this data correspond to signals in which the phase of the signals stored at addresses 0 through m−1 is shifted by 180°.

<Description of system operation>

FIG. 5 is a list of arithmetic expressions representing signals at various locations in the system of the present embodiment.

The operation of the spread-spectrum communication apparatus constructed as set forth above will be described with reference to FIG. 5.

On the transmitting side, the address clock of the frequency mfd generated by the clock source 11 and the data synchronized to the data clock of frequency fd enters the address generator 12. With regard to one bit of data, the address generator 12 generates m-number of address signals in synchronization with the address clock. If the input data is "0", the address generator 12 generates addresses 0 through m−1 in regular order. If the input data is "1", the address generator 12 generates addresses m through 2m−1 in regular order.

The address signals enter the memory 13, the contents of which (shown in FIG. 4) are outputted in regular order in accordance with the addresses. The output signal of the memory 13 is converted into discrete analog data by the D/A converter 14, and the output signal of the D/A converter 14 is subjected to anti-aliasing by the LPF 15 to obtain output an analog signal indicated by the Expression 1 of FIG. 5. This signal is a signal having a waveform generated from the data in memory 13. In Expression 1, the value of d(t) is 1 or −1 in dependence upon the value of the input data, namely the phase of the generated signal. FIG. 2 is a spectrum of the signal represented by Expression 1.

The output signal of the LPF 15 is frequency-converted to the transmission frequency band by the mixer 16, and only the transmission-band signal is extracted by the BPF 18 and sent to the transmission line 19. If we let fc represent the frequency of the signal generated by the local oscillator 17, then the sent signal will be expressed by Expression 2 in FIG. 5.

On the receiving side, unnecessary signals which have become mixed in with the signal on the transmission line are removed from the received signal by the BPF 110, and the resulting output signal enters the mixer 111 as one input thereto.

The output of the LPF 118 is expressed by Expression 3 in FIG. 5. This output signal is mixed with the signal from the local oscillator 120 by the mixer 119. The output of the mixer is applied to the BPF 121, the output of which is a signal having the prescribed frequency band. If we let fc' represent the frequency of the signal from the local oscillator 120, then the output signal of the BPF 121 will be represented by Expression 4 in FIG. 5. Accordingly, the signal of Expression 2 and the signal of Expression 4 enter the mixer 111, the output signal whereof is represented by Expression 5 in FIG. 5 (where fc−fc'=$f_{IF}$ is assumed to hold).

If the pass frequency of the BPF 112 is a bandwidth of 2fd at the center frequency $f_{IF}$, the signal which passes through the BPF 112 is represented by Expression 6 in FIG. 5. More specifically, if the spread-spectrum code sequence and the reverse spread-spectrum code sequence are the same, then Ci−Ci'=0 will hold and all of the signals will pass through the BPF 112 so that the signal voltage increases by a factor of n.

Meanwhile, if noise voltages are assumed to be arithmetic white Gaussian noise, none of these will be correlated. Consequently, the average added voltage is increased only by a factor of $n^{1/2}$ at most, and therefore the S/N ratio after passage through the BPF 112 is increased by a factor of n [i.e., $n^2/(n^{1/2})^2$].

Accordingly, when the arrangement is such that the spread-spectrum code sequence {Ci} is selected from a set having small correlation, a signal which has passed through the BPF 112 is not increased by a factor of n in the case of a receiver which uses a different code. As a consequence, enough signal power for demodulation is no longer obtained in such a receiver. Accordingly, multiple connections based upon code division become possible.

Since the output of the BPF 112 is a signal similar to the PSK modulation signal used in ordinary narrowband communication, the clock reproducer 113 reproduces the data clock and the address clock from the output of the BPF 112, in the same manner as conventional demodulation of a narrowband signal, and these clock signals are supplied to the demodulator 114 and address generator 115, respectively. The demodulator 114 PSK-demodulates the output of the BPF 112 in accordance with the data clock, whereby the original data is obtained.

The frequency of the address clock is m times that of the data clock frequency.

The address generator 115 generates m-number of address signals of addresses 0 through m−1 in regular order in synchronization with the address clock. These address signals enter the memory 116. (Memory 116 outputs the data shown in FIG. 3 in accordance with the address signal.) A prescribed signal is produced by the D/A converter 117 and LPF 118 on the basis of the data outputted from the memory 116. The output of the LPF 118 is a signal represented by Expression 3 in FIG. 5, as described earlier.

By virtue of the construction and operation of the system set forth above, it is unnecessary to synchronize the spread-spectrum codes on the sending and receiving sides in the spread-spectrum communication system according to this embodiment. As a result, there is no temporal overhead for spread-spectrum code synchronization, and synchronization of the spread-spectrum code is not lost during communication.

[Second Embodiment]

A second embodiment of the present invention will now be described.

The configuration of the spread-spectrum communication system according to the second embodiment is the same as that of the first embodiment. The only difference is the data stored in the memory 13. Accordingly, the following description will deal with the data stored in memory 13.

In the first embodiment, the data stored in the memory 13 is a PSK-modulated wave in which there is no band limitation with regard to each frequency slot.

Figure 6:
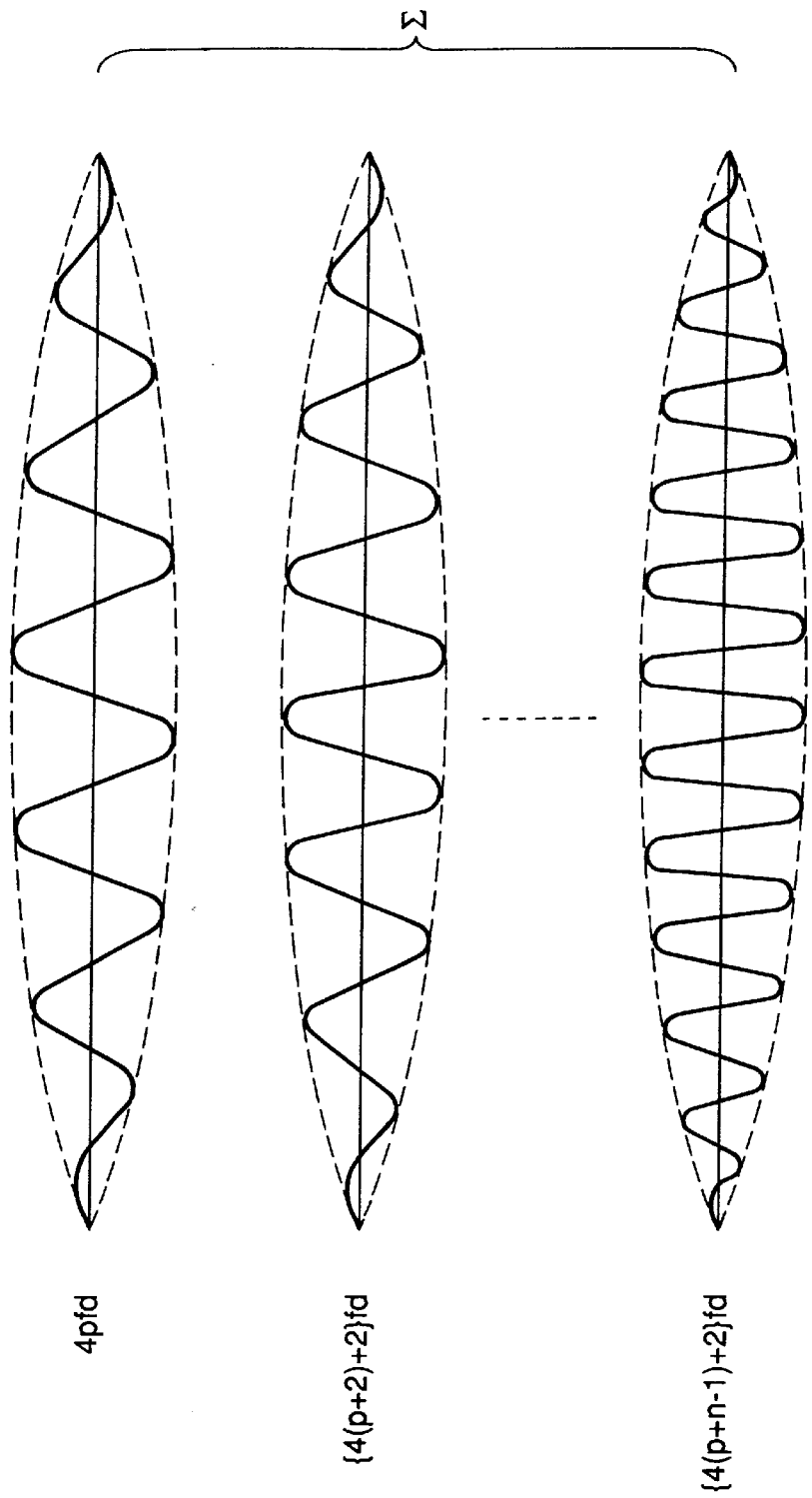
FIG. 6 is a waveform diagram showing the waveform of an analog signal based upon data stored in a memory on a transmitting side in the first embodiment.

By contrast, in the system according to the second embodiment, the envelope of the signal of each frequency component constituting the transmitted signal is shaped in order to suppress components outside the band of the signal corresponding to each frequency slot. In other words, instead of the data stored in the memory 13 in the first embodiment, here data in which a signal having a shaped envelope serves as the component of each frequency is stored in the memory 13. As one example of such a band limitation, refer to the example shown in FIG. 6, which is for a case where the weighting of amplitude level is used. As shown in FIG. 6, the system of this embodiment generates, on the basis of the data stored in the memory 13, signals in which a signal whose envelope has been shaped is made to serve as the component of each frequency. This makes it possible to obtain a demodulating performance better than that of the first embodiment.

[Third Embodiment]

A third embodiment of the invention will now be described.

In the system of this embodiment, the items of data in the memories 13 and 116 of the system of the first embodiment are interchanged. In this embodiment, the fact that the data stored in these memories is digital data representing a prescribed signal waveform is not different from the first embodiment. With the exception of this data, the configuration of this embodiment is identical with that of the first embodiment.

Accordingly, the data stored in the memories 13 and 116 will be described in detail.

<Description of data>

The data in the memory 116 is data for generating a signal composed of n-number of frequency components. If we let fd represent the frequency of the data clock, then the n-number of frequency components will be represented by the following:

$$2pfd, 2(p+1)fd, 2(p+2)fd, \ldots, 2(p+n-1)fd$$

where p is a positive integer.

The frequency of the address clock is more than twice the maximum frequency of the above-mentioned components and is represented by mfd [m≧4(p+n−1)+1). Furthermore, reverse spread-spectrum codes C0', C1', C2', Cn−1' are allocated beforehand to these frequency components, and each has a value of −1 or 1.

Data of the kind shown in FIG. 7 is stored in the memory 116. Specifically, the memory 116 is divided into m-number of locations at addresses 0 through m−1. Data obtained in a case where a signal in which the aforesaid frequency components have been added together is sampled at a sampling rate mfd is stored in the memory locations of memory 116 in numerical order every 1/mfd from time 0.

On the transmitting side, meanwhile, two signals displaced in phase by 180° are stored in the memory 13 in order to perform PSK modulation by the data which enters from the information source. That is, the memory 13 is divided into 2m-number of locations from addresses 0 through 2m−1. The m-number of memory locations at addresses 0 through m−1 are allocated to signals corresponding to data "0", and the m-number of memory locations at addresses m through 2m−1 are allocated to signals corresponding to data "1".

The data in memory 13 is data of the kind shown in FIG. 8. In FIG. 8, C0, C1, C2, . . . , Cn−1 represent spread-spectrum codes each having a value of −1 or 1.

In FIG. 8, the contents at addresses 0 through m−1 of memory 13 are the same as the contents in memory 116 shown in FIG. 7 except for the fact that the reverse spread-spectrum code sequence has been replaced by the spread-spectrum code sequence. More specifically, sampling data obtained in a case where a signal comprising frequency components 2pfd, 2(p+1)fd, 2(p+2)fd, . . ., 2(p+n−1)fd is sampled at the sampling rate mfd is stored at addresses 0 through m−1 in numerical order every 1/mfd from time 0. Further, data which is the reverse of the sampling data is stored at addresses m through 2m−1. This data corresponds to signals in which the phase of the signals stored at addresses 0 through m−1 is shifted by 180°. The frequency components of these signals have their phase shifted 0 or 180° by the spread-spectrum codes.

<Description of system operation>

FIG. 9 is a list of arithmetic expressions representing signals at various locations in the system of the present embodiment.

The operation of the spread-spectrum communication apparatus constructed as set forth above will be described with reference to FIG. 9.

In the system according to this embodiment, data is read out of the memory 13 and the output of this memory is rendered into an analog signal, which is indicated by Expression 11 in FIG. 9, via the D/A converter 14 and LPF 15, through a process similar to that of the first embodiment.

Figure 10:
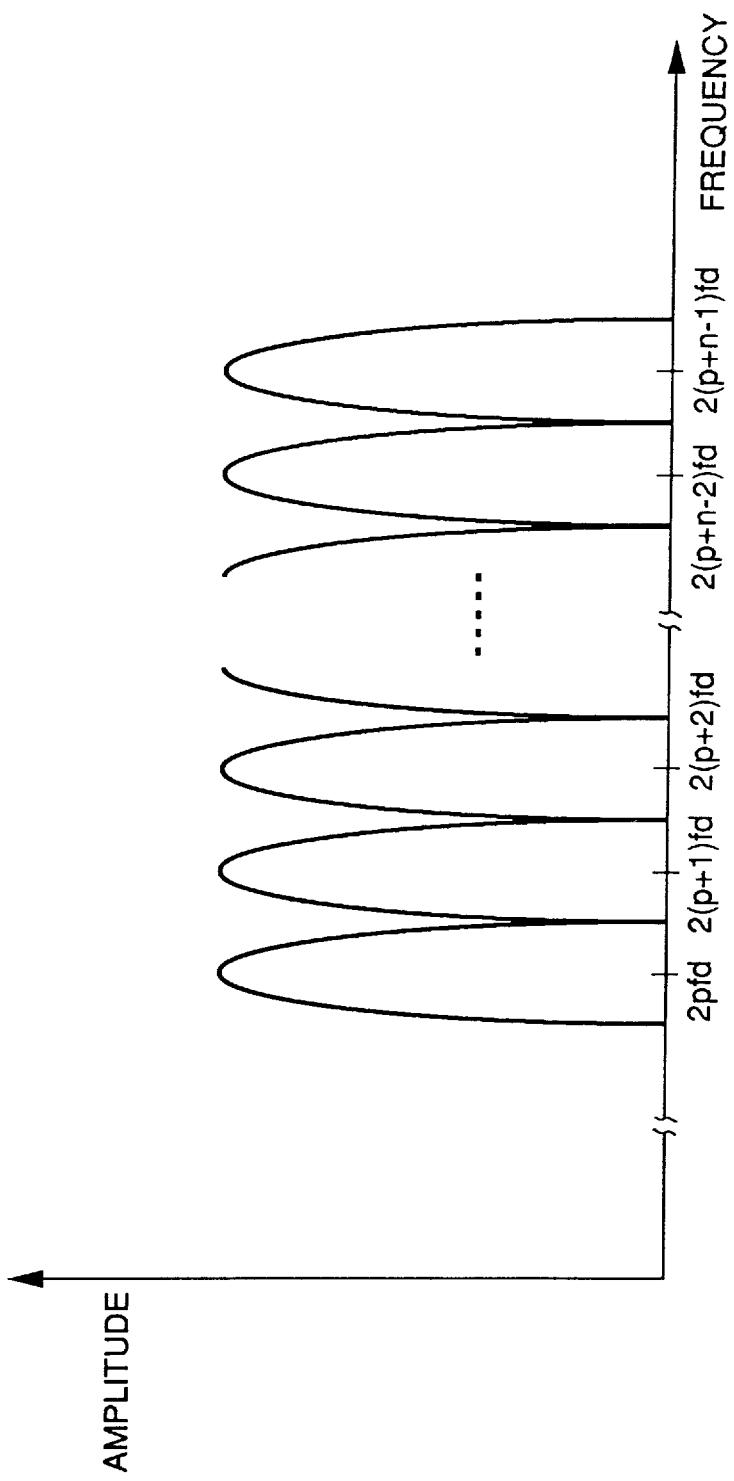
FIG. 10 is a diagram showing a frequency distribution of an analog signal based upon data stored in a memory in the third embodiment.

FIG. 10 is a spectrum of the signal represented by Expression 11.

The analog signal is frequency-converted by the mixer 16, and only the transmission-band signal is extracted by the BPF 18 and sent to the transmission line 19. If we let fc represent the frequency of the local oscillator 17, then the signal sent to the transmission line 19 will be expressed by Expression 12 in FIG. 9.

On the receiving side, unnecessary signals which have become mixed in with the signal on the transmission line 19 are removed from the received signal by the BPF 110, and the resulting output signal enters the mixer 111 as one input thereto.

The output of the LPF 118 is expressed by Expression 13 in FIG. 9. This output signal is mixed with the signal from the local oscillator 120 by the mixer 119, the output of which is passed through the BPF 121 to obtain a signal having the prescribed frequency band. If we let fc' represent the frequency of the local oscillator 120, then the output signal of the BPF 121 will be represented by Expression 14 in FIG. 9. Accordingly, the output of the mixer 111 is represented by Expression 15 in FIG. 9 (where fc−fc'=$f_{IF}$ is assumed to hold).

If the pass frequency of the BPF 112 is a bandwidth of 2fd at the center frequency $f_{IF}$, the signal which passes through the BPF 112 is Expression 16 in FIG. 9. More specifically, if the spread-spectrum code sequence and the reverse spread-spectrum code sequence are the same, then Ci·Ci'=1 will hold and the signals which pass through the BPF 112 are all added in the same phase so that the signal voltage increases by a factor of n.

Meanwhile, if noise voltages are assumed to be arithmetic white Gaussian noise, none of these will be correlated. Consequently, the average added voltage is increased only by a factor of $n^{1/2}$ at most, and therefore the S/N ratio after passage through the BPF 112 is increased by a factor of n [i.e., $n^2/(n^{1/2})^2$].

When the arrangement is such that the spread-spectrum code sequence {Ci} is selected from a set having small correlation, as described above, a signal which has passed through the BPF 112 is not increased by a factor of n in the case of a receiver which uses a different code. As a consequence, enough signal power for demodulation is no longer obtained in such a receiver. Accordingly, multiple connections based upon code division become possible.

The clock reproducer 113 reproduces the data clock and the address clock from the output of the BPF 112, as in the preceding embodiment, and these clock signals are supplied to the demodulator 114 and address generator 115, respectively. The demodulator 114 PSK-demodulates the output of the BPF 112 in accordance with the data clock, whereby the original data is obtained.

The spread-spectrum communication system constructed as set forth above has effects similar to those of the system according to the first embodiment.

[Fourth Embodiment]

A fourth embodiment of the present invention will now be described.

The configuration of the spread-spectrum communication system of the fourth embodiment is identical with that of the third embodiment with the exception of the data stored in the memory 13. Accordingly, the data stored in memory 13 will be described.

In the third embodiment, the data stored in the memory 13 is a PSK-modulated wave in which there is no band limitation with regard to each frequency slot.

Figure 11:
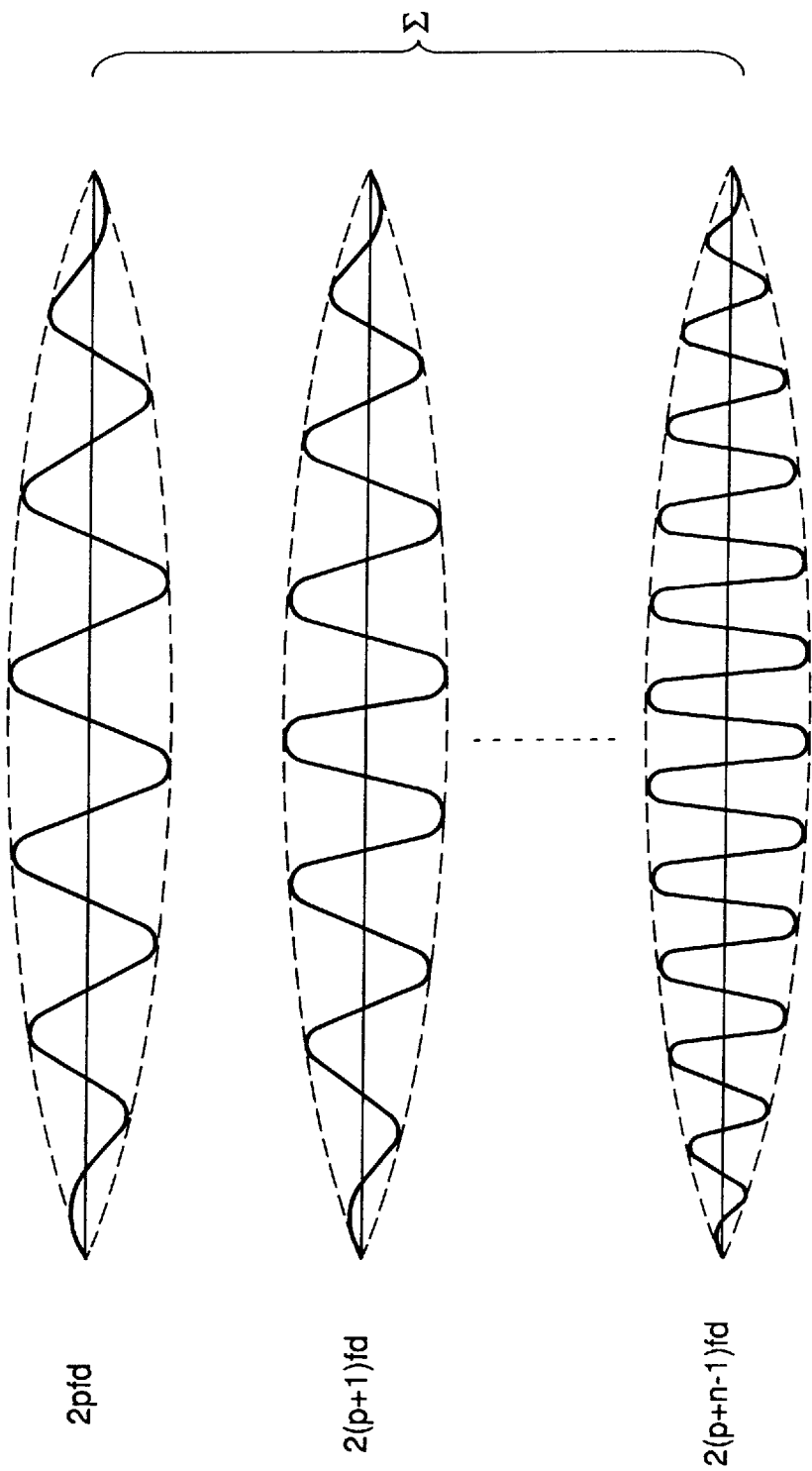
FIG. 11 is a waveform diagram showing the waveform of an analog signal based upon data stored in a memory in a fourth embodiment of the present invention.
Figure 21:
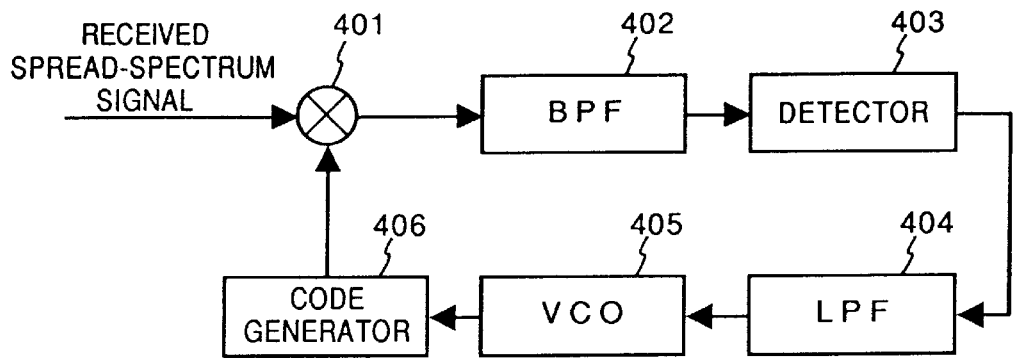
FIG. 21 is a block diagram showing an example of the prior art.
Figure 22:
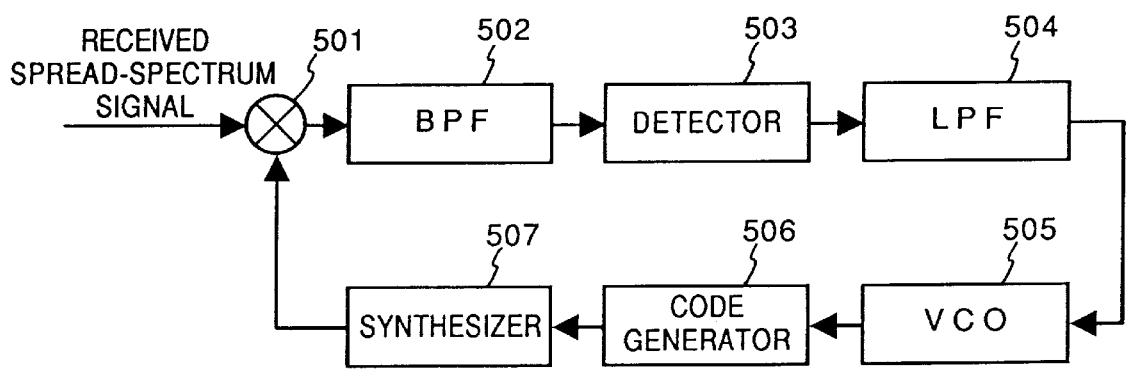
FIG. 22 is a block diagram showing another example of the prior art.

By contrast, in the system according to the fourth embodiment, the envelope of the signal of each frequency component constituting the transmitted signal is shaped in order to suppress components outside the band of the signal corresponding to each frequency slot. In other words, instead of the data stored in the memory 13 in the third embodiment, here data in which a signal having a shaped envelope serves as the component of each frequency is stored in the memory 13. As one example of such a band limitation, refer to the example shown in FIG. 11, which is for a case where the weighting of amplitude level is used. As shown in FIG. 11, the system of this embodiment generates, on the basis of the data stored in the memory 13, signals in which a signal whose envelope has been shaped is made to serve as the component of each frequency. This makes it possible to obtain a demodulating performance better than that of the third embodiment.

[Fifth Embodiment]

FIG. 12 is a block diagram illustrating the configuration of a spread-spectrum communication system according to a fifth embodiment of the present invention. In the system according to the fifth embodiment, discrete data obtained by digitizing a prescribed signal which contains a spread-spectrum code is stored in a memory in advance. When data enters from an information source, the data is modulated, after which the discrete data stored in the memory is read out and converted into a prescribed signal, a spread-spectrum signal corresponding to the input data is generated, and the data is transmitted. When a spread-spectrum signal is received by this system, data obtained by digitizing a prescribed signal which contains a reverse-spread code is read out, and the prescribed signal is generated from this data. The received spread-spectrum signal is subjected to reverse spreading using this prescribed signal, and a signal obtained by reverse spreading is demodulated. The fifth embodiment of the invention will be described in detail with reference to the drawings.

<System configuration>

As shown in FIG. 12, a modulator 101, which is a narrowband digital modulator, modulates inputted data by a prescribed frequency band corresponding to the data.

A clock source 102 outputs an address clock whose frequency is at least twice the maximum frequency of signal components stored in the memory 104. A data clock whose frequency is obtained by suitably frequency-dividing this frequency is supplied to the information source.

An address generator 103 generates an address signal from the address clock, which enters from the clock source 102, and from data that enters from the information source in synchronization with the data clock.

Stored beforehand in the memory 104 is discrete data obtained by digitizing the waveform of a signal comprising carrier-wave components of a plurality of frequencies. The data stored in the memory 104 is read out based upon the address signal which enters from the address generator 103.

A D/A converter 105 subjects the output signal from the memory 104 to a D/A conversion, and a low-pass filter (LPF) 106 subjects the output signal from the D/A converter 105 to anti-aliasing.

A mixer 107 multiplies the signal having the prescribed frequency band outputted by the modulator 101 and carrier waves of plurality frequencies obtained from the LPF 106, thereby producing a spread-spectrum signal. A band-pass filter (BPF) 108 extracts only transmission-band signals from the spread-spectrum signal and sends the extracted signals to the transmission line 109.

On the receiving side, a BPF 150 removes signals, which become mixed in the transmission line 109 and are outside the band, from the received signal. A BPF 152 passes signals having a bandwidth the same as that of the narrowband modulated signal outputted by the modulator 101 and removes signals other than these from the output of the mixer 151.

A demodulator 153 performs reproduction of the data clock and demodulation of data from the output of the BPF 152, and an address-clock reproducer 154 reproduces an address clock based upon the data clock reproduced by the demodulator 153.

An address generator 155 generates an address signal in synchronization with the address clock reproduced by the clock reproducer 154. Data for forming a signal comprising carrier-wave components of a plurality of frequencies is stored in a memory 156. The memory 156 outputs the data, which has been stored in advance, in accordance with the address signal outputted thereto.

A D/A converter 157 subjects the output signal from the memory 156 to a D/A conversion, and an LPF 158 subjects the output signal of the D/A converter 157 to anti-aliasing and outputs the result to the mixer 151.

In the arrangement described above, data enters the modulator 101 in correspondence with the data clock supplied to the information source. It is assumed that the inputted data takes on a binary value of 1 or −1.

FIG. 13 is a block diagram showing the construction of the modulator 101.

The modulator shown in FIG. 13 is a GMSK (Gaussian-filtered minimum shift keying) modulator having a Gaussian filter 201 and a voltage-controlled oscillator (VCO) 202, which has a center frequency of fc and a modulation index of value 0.5.

The Gaussian filter 201 produces a signal in response to the input data, namely a square-wave pulse. This signal has the shape of a bell whose two sides are flattened at the corners of the square wave. The spread of the foot is dependent upon BT (where B is a 3 db bandwidth of the Gaussian filter 201 and T is the time of one bit of data). An excellent narrowband characteristic can be obtained by selecting the value of BT appropriately. The VCO 202 is MSK-modulated by the output of the Gaussian filter 201, whereby a GMSK-modulated wave is outputted. If the GMSK-modulated wave is written upon being separated into carrier-wave components and low-pass components, we will have $S(t)\cos 2\pi t$, where $S(t)$ represents the low-pass components.

An address clock whose frequency is m times that of the data clock outputted by the clock source 102 enters the address generator 103. The address generator 103 generates address signals of addresses 0 through m−1 in regular order in synchronization with the address clock and outputs these signals to the memory 104.

The data stored in the memory 104, which is data comprising the values of signals at prescribed time intervals, forms a signal waveform composed of n-number of frequency components. Transmission spread codes C0, C1, C2, ..., Cn−1 are allocated to these frequency components in advance. Each transmission spread code has a value of −1 or 1.

If we let fd represent the frequency of the data clock, then the frequency components will be represented by the following:

$$2pfd,\ 2(p+1)fd,\ 2(p+2)fd,\ \ldots\ 2(p+n-1)fd$$

where p is a positive integer.

The address clock is represented by mfd [$m \geq 4(p+n-1)+1$) under the condition that it is more that twice the maximum frequency. The memory 104 outputs the data at addresses 0 through m−1 shown in FIG. 15 to the D/A converter 105 in regular order in accordance with the inputted address signals. The D/A converter 105 converts the above-mentioned digital data into a discrete analog signal and outputs the analog signal to the LPF 106. The output of the LPF 106 is mixed with the output signal of the modulator 101, as described earlier.

FIG. 17 is a list of arithmetic expressions representing signals at various locations in the system of the fifth embodiment.

The LPF 106 subjects the discrete analog signal outputted by the D/A converter 105 to anti-aliasing and then applies the analog signal, which is expressed by Expression 21 in FIG. 17, to the mixer 107.

This analog signal is a local oscillation output comprising a plurality of carrier waves. The narrowband modulated wave outputted by the modulator 101 is multiplied by the local oscillation output in the mixer 107. The BPF 108 extracts only transmission-band signals from the output signal of the mixer 107 and sends the extracted signals to the transmission line 109. The signal waveform on the transmission line is indicated by Expression 22 in FIG. 17.

The address-clock reproducer 154 reproduces the address clock, the frequency of which is increased by a factor of n, from the data clock reproduced by the demodulator 153. The address generator 155 generates address signals in synchronization with the address clock and inputs the address signals to the memory 156. The data in the memory 156 is data obtained by digitizing the signal composed of the n-number of frequency components $2pfd,\ 2(p+1)fd,\ \ldots\ 2(p+n-1)fd$. Reverse spread-spectrum codes C0, C1, C2, ..., Cn−1' are allocated to these frequency components in advance. Each code has a value of −1 or 1. Each frequency component in the memory 156 has a frequency identical with that of a frequency component in the memory 104. The data in memory 156 is the data shown in FIG. 16.

The D/A converter 157 subjects the signal read out of the memory 156 to processing similar to that performed by the D/A converter 105, and the LPF 158 subjects the output signal of the D/A converter 157 to processing similar to that performed by the LPF 106. That is, the output signal of the LPF 158 is indicated by Expression 23 in FIG. 17. Accordingly, the output of the mixer 151 is indicated by Expression 24 in FIG. 17.

If the center frequency and bandwidth of the BPF 152 are represented by fc and 2fd, respectively, the signal which passes through the BPF 152 is only a signal for which i=j holds and is represented by Expression in FIG. 17. The output of the BPF 152 enters the GMSK demodulator 153, which proceeds to reproduce the data clock and data.

If the spread-spectrum code and the reverse spread-spectrum code are identical, $Ci \cdot Ci' = 1$ will hold. Consequently, all signals which have passed through the BPF 152 are added at the same phase and therefore the signal voltage is increased by a factor of n.

Meanwhile, if noise voltages are assumed to be arithmetic white Gaussian noise, none of these will be correlated. Consequently, the average added voltage is increased only by a factor of $n^{1/2}$ at most, and therefore the S/N ratio after passage through the BPF 152 is increased by a factor of n [i.e., $n^2/(n^{1/2})^2$].

When the arrangement is such that the spread-spectrum code sequence {Ci} is selected from a set having small correlation, a signal which has passed through the BPF 152 is not increased by a factor of n in the case of a receiver which uses a different code. As a consequence, enough signal power for demodulation is no longer obtained in such a receiver. Accordingly, multiple connections based upon code division become possible.

Since narrowband modulation is used for modulation based upon data, signal components outside the band of the signals corresponding to the frequency components following spreading are suppressed, and these do not become signals that interfere with the signals corresponding to the other frequency components. This makes it possible to realize excellent demodulation performance.

[Sixth Embodiment]

A sixth embodiment of the present invention will now be described.

The sixth embodiment has a configuration similar to that of the fifth embodiment with the exception of the construction of the modulator 101 and demodulator 153. Accordingly, the modulator 101 and demodulator 153 will be described.

In the fifth embodiment, GMSK is used as the narrowband modulation method implemented by the modulator 101. In this embodiment, a TMF (tamed FM) method is employed.

FIG. 14 is a block diagram showing the construction of the modulator 101.

In FIG. 14, delay circuits 301~303 delay the data by time equivalent to one bit, and multipliers 304~306 multiply the outputs of the delay circuits 301~303 by coefficients ¼, ½, ¼, respectively. An adder 307 adds the outputs of the multipliers 304~306.

A whitening filter 308 is a filter which converts square-wave pulses into impulses, and a Nyquist filter 309 is a filter for satisfying a first reference of a Nyquist. A phase modulator 310 is for performing phase modulation based upon the output signal of the Nyquist filter 309. In this case, the demodulator 153 is a TFM demodulator.

When data which takes on a value of −1 or 1 enters the modulator 310 having the foregoing construction, the binary signal response level is split into five levels by the circuitry from the delay circuit 301 to the adder 307, and correlation coding is performed in which a transition is made from a certain signal level to a specific signal level depending upon the internal states of the delay circuits 301~303. The whitening filter 308 and Nyquist filter 309 smoothen the modulated signal outputted by the adder 307, and the phase modulator 310 performs phase modulation by this modulated signal.

More specifically, since the change in the phase of the modulated output becomes smooth, narrowband modulation is realized. As a result, since the signal components outside the band of the signals corresponding to the frequency components are suppressed, these do not become signals that interfere with the signals corresponding to the other frequency components. This makes it possible to realize excellent demodulation performance.

[Seventh Embodiment]

A seventh embodiment of the present invention will now be described.

In the system of this embodiment, the items of data stored in the memories 104 and 156 of the system of the fifth embodiment are interchanged. With the exception of this data, the configuration of this embodiment is identical with that of the fifth embodiment. Accordingly, the data stored in the memories 104 and 156 will be described in detail.

The data in the memory 104 is discrete data obtained by digitizing a signal, which is composed of n-number of frequency components, based upon a sampling theorem. Transmission spread codes C0, C1, C2, . . . , Cn−1 are given beforehand with regard to the frequency components, and each code has a value of 0 or 1.

If we let fd represent the frequency of the data clock, then the frequency components will be represented by the following:

$$(4p+2C0)fd, \{4(p+1)+2C1\}fd, \{4(p+2)+2C2\}fd, \ldots, \{4(p+n-1)+2Cn-1\}fd$$

where p is a positive integer.

The frequency of the address clock is greater than twice the maximum frequency of the above-mentioned components and is represented by mfd [$m \geq 8(p+n-1)+1$]. The data in the memory 104 has the values shown in FIG. 18.

The memory 104 outputs the data shown in FIG. 18 to the D/A converter 105 in accordance with the inputted address signal. The D/A converter 105 converts the digital data which has entered from the memory 104 into a discrete analog signal and outputs the signal to the LPF 106.

FIG. 20 is a list of arithmetic expressions representing signals at various locations in the system of the present embodiment.

The LPF 106 subjects the discrete analog signal outputted by the D/A converter 105 to anti-aliasing and then applies the analog signal, which is expressed by Expression 31 in FIG. 17, to the mixer 107. This analog signal is a local oscillation output comprising a plurality of carrier waves.

The narrowband modulated wave outputted by the modulator 101 is multiplied by the local oscillation output in the mixer 107. The BPF 108 extracts only transmission-band signals from the output signal of the mixer 107 and sends the extracted signals to the transmission line 109. The waveform at this time is indicated by Expression 32 in FIG. 20.

On the receiving side, unnecessary signals which become mixed in the transmission line 108 are removed from the received signal by the BPF 110, and the resulting output is delivered to the mixer 151.

The address-clock reproducer 154 reproduces the address clock from the data clock reproduced by the demodulator 153. The address generator 155 generates address signals in synchronization with the address clock and inputs the address signals to the memory 156. The data in the memory 156 is data obtained by digitizing the signal composed of the n-number of frequency components. Reverse spread-spectrum codes C0', C1', C2', . . . , Cn−1' are allocated to these frequency components in advance. Each code has a value of −1 or 1. Each frequency component in the memory 156 has a frequency identical with that of a frequency component in the memory 104. The data in memory 156 is the data shown in FIG. 19.

The D/A converter 157 subjects the output of the memory 156 to processing similar to that performed by the D/A converter 105, and the LPF 158 subjects the output signal of the D/A converter 157 to processing similar to that performed by the LPF 106. That is, the output signal of the LPF 158 is indicated by Expression 33 in FIG. 20. Accordingly, the output of the mixer 151 is indicated by Expression 34 in FIG. 17.

If the center frequency and bandwidth of the BPF 152 are represented by fc and 2fd, respectively, the signal which passes through the BPF 152 is only a signal for which i=j holds and is represented by Expression 35 in FIG. 20. The output of the BPF 152 enters the GMSK demodulator 153, which proceeds to reproduce the data clock and data.

If the spread-spectrum code and the reverse spread-spectrum code are identical, Ci−Ci'=0 will hold. Consequently, all signals which have passed through the BPF 152 are added at the same phase and therefore the signal voltage is increased by a factor of n.

Meanwhile, if noise voltages are assumed to be arithmetic white Gaussian noise, none of these will be correlated. Consequently, the average added voltage is increased only by a factor of $n^{1/2}$ at most, and therefore the S/N ratio after passage through the BPF 152 is increased by a factor of n [i.e., $n^2/(n^{1/2})^2$].

When the arrangement is such that the spread-spectrum code sequence {Ci} is selected from a set having small correlation, a signal which has passed through the BPF 152 is not increased by a factor of n in the case of a receiver which uses a different code. As a consequence, enough signal power for demodulation is no longer obtained in such a receiver. Accordingly, multiple connections based upon code division become possible.

Since narrowband modulation is used for modulation based upon data, signal components outside the band of the signals corresponding to the frequency components following spreading are suppressed, and these do not become signals that interfere with the signals corresponding to the other frequency components. This makes it possible to realize excellent demodulation performance.

In the seventh embodiment also, it is possible to construct a system which performs processing similar to the foregoing by employing the TFM-type modulator 101 and demodulator 153 described in the seventh embodiment.

As many apparently widely different embodiments of the present invention can be made without departing from the spirit and scope thereof, it is to be understood that the invention is not limited to the specific embodiments thereof except as defined in the appended claims.

What is claimed is:

1. A spread-spectrum signal transmitting apparatus comprising:

storing means for storing, as digital data, a signal having a waveform that is determined from a prescribed spread-spectrum code sequence;

signal generating means for generating, based upon transmission data and data stored in said storing means, the signal having the determined waveform; and transmitting means for transmitting the signal generated by said signal generating means through a transmission line.

2. The apparatus according to claim 1, wherein said signal has a waveform obtained by combining a plurality of signals having mutually different frequencies corresponding to each digit and the value of each digit in the spread-spectrum code sequence.

3. The apparatus according to claim 1, wherein said signal has a waveform obtained by combining a plurality of signals, which have mutually different frequencies corresponding to digits in the spread-spectrum code, upon reversing the phases of the signal in dependence upon the value of each digit.

4. The apparatus according to claim 1, wherein said storing means stores a signal, which has been digitized at a frequency based upon a sampling theorem, as data.

5. The apparatus according to claim 4, wherein said signal generating means includes:

clock generating means for generating an address clock having a frequency identical with that of the digitizing frequency and a data clock having a period which is a whole-number multiple of that of the address clock; and address generating means for generating an address signal in synchronization with the address clock based upon transmission data inputted in synchronization with the data clock.

6. The apparatus according to claim 1, wherein said signal generating means includes:

converting means for converting the digital data into discrete analog data.

7. The apparatus according to claim 2, wherein each of the plurality of signals having the mutually different frequencies has a waveform whose envelope is shaped.

8. The apparatus according to claim 3, wherein each of the plurality of signals having the mutually different frequencies has a waveform whose envelope is shaped.

9. A spread-spectrum signal receiving apparatus comprising:

storing means for storing as digital data, a signal having a waveform that is determined from a prescribed reverse spread-spectrum code sequence;

signal generating means for generating the signal having the determined waveform based upon said data; and demodulating means for demodulating data from said signal generated by the signal generating means and a received signal.

10. The apparatus according to claim 9, wherein said signal generating means includes:

reading means for reading data out of said storing means in dependence upon the received signal;

a signal generating unit which generates the signal having the predetermined waveform based upon the data read out by said reading means;

oscillating means for producing a signal having a prescribed frequency; and multiplying means for multiplying the signal generated by said signal generating unit by the signal having the prescribed frequency produced by said oscillating means.

11. The apparatus according to claim 10, wherein said signal has a waveform obtained by combining a plurality of signals having mutually different frequencies corresponding to each digit and the value of each digit in the spread-spectrum code sequence.

12. The apparatus according to claim 10, wherein said signal has a waveform obtained by combining a plurality of signals, which have mutually different frequencies corresponding to digits in the spread-spectrum code, upon reversing the phases of the signal in dependence upon the value of each digit.

13. The apparatus according to claim 9, wherein said storing means stores a signal, which has been digitized at a frequency based upon a sampling theorem, as data.

14. The apparatus according to claim 13, wherein said signal generating means includes:

clock generating means for generating an address clock and a data clock having a period which is a whole-number multiple of that of the address clock based upon the signal, which is generated by said signal generating means, and the received signal; and address generating means for generating an address signal in synchronization with the address clock.

15. The apparatus according to claim 10, wherein said signal generating unit includes:

a converter which converts the digital data into discrete analog data; and a filter which filters the discrete analog data and performs anti-aliasing.

16. A spread-spectrum signal transmitting apparatus comprising:

modulating means for modulating transmission data;

storing means for storing, as digital data, a signal having a waveform that is determined from a prescribed spread-spectrum code sequence;

signal generating means for generating the signal having the determined waveform based upon the data stored in said storing means;

multiplying means for multiplying an output signal from said modulating means by the signal generated by said signal generating means to produce said spread-spectrum signal; and transmitting means for transmitting said spread-spectrum signal over a transmission medium.

17. The apparatus according to claim 16, wherein said signal has a waveform obtained by combining a plurality of signals having mutually different frequencies corresponding to each digit and the value of each digit in the spread-spectrum code sequence.

18. The apparatus according to claim 16, wherein said signal has a waveform obtained by combining a plurality of signals, which have mutually different frequencies corresponding to digits in the spread-spectrum code, upon reversing the phases of the signal in dependence upon the value of each digit.

19. The apparatus according to claim 16, wherein said storing means stores a signal, which has been digitized at a frequency based upon a sampling theorem, as data.

20. The apparatus according to claim 19, wherein said signal generating means includes:

clock generating means for generating an address clock having a frequency identical with that of the digitizing frequency and a data clock having a period which is a whole-number multiple of that of the address clock; and address generating means for generating an address signal in synchronization with the address clock.

21. The apparatus according to claim 16, wherein said signal generating means includes:

converting means for converting the digital data into discrete analog data; and filtering means for filtering the discrete analog data and performing anti-aliasing.

22. The apparatus according to claim 16, wherein said modulating means is a Gaussian-filtered minimum shift keying modulator.

23. The apparatus according to claim 16, wherein said modulating means is a tamed-FM modulator.

24. A spread-spectrum signal receiving apparatus comprising:

receiving means for receiving a spread spectrum signal;

storing means for storing as digital data, a signal having a waveform that is determined from a prescribed reverse spread-spectrum code sequence;

signal generating means for generating the signal having the determined waveform based upon said data; and reproducing means for reproducing original data and a data clock from the signal generated by said signal generating means and from a received signal.

25. The apparatus according to claim 24, wherein said signal generating means includes:

reading means for reading data out of said storing means in dependence upon the received signal; and a signal generating unit which generates the signal having the predetermined waveform based upon the data read out by said reading means.

26. The apparatus according to claim 25, wherein said signal has a waveform obtained by combining a plurality of signals having mutually different frequencies corresponding to each digit and the value of each digit in the spread-spectrum code sequence.

27. The apparatus according to claim 25, wherein said signal has a waveform obtained by combining a plurality of signals, which have mutually different frequencies corresponding to digits in the spread-spectrum code, upon reversing the phases of the signal in dependence upon the value of each digit.

28. The apparatus according to claim 24, wherein said storing means stores a signal, which has been digitized at a frequency based upon a sampling theorem, as data.

29. The apparatus according to claim 25, wherein said signal generating unit includes:

a clock generator which generates an address clock having a frequency which is a whole-number multiple of that of the data clock based upon the data clock reproduced by said reproducing means; and an address generator which generates an address signal in synchronization with the address clock.

30. The apparatus according to claim 25, wherein said signal generating means includes:

converting means for converting the digital data into discrete analog data; and filtering means for filtering the discrete analog data and performing anti-aliasing.

31. A spread-spectrum signal transmitting apparatus comprising:

clock means for generating an address clock having a speed which is a whole-number multiple of an information transmission speed, and a data clock having a speed identical with the information transmission speed;

address generating means for generating an address signal based upon data, which is inputted in synchronization with the data clock, and said address clock;

memory means for outputting discrete data based upon the address signal generated by said address generating means, in which oscillations having a plurality of mutually different frequencies are contained in said discrete data as components, and displacement from the center frequency of each component is determined by the value of each digit of a prescribed spread-spectrum code;

converting means for converting said discrete data into a discrete analog signal;

modulating means for modulating a carrier wave by said discrete analog signal to produce a spread-spectrum signal; and transmitting means for transmitting said modulated discrete analog signal through a transmission line.

32. A spread-spectrum signal receiving apparatus comprising:

receiving means for receiving said spread spectrum signal;

mixer means for converting a signal received from a transmission line into a predetermined-frequency signal;

clock regenerating means for generating a data clock and an address clock based upon an output from said mixer means;

demodulating means for reproducing original data based upon the data clock and the output of said mixer means;

address generating means for generating an address signal in synchronization with the address clock;

memory means for outputting discrete data based upon the address signal, in which oscillations having a plurality of mutually different frequencies are contained in said discrete data as components, and displacement from the center frequency of each component is determined by the value of each digit of a prescribed spread-spectrum code; and converting means for converting said discrete data into a discrete analog signal and outputting said discrete analog signal to said mixer means.

33. A spread-spectrum signal transmitting apparatus comprising:

clock means for generating an address clock having a speed which is a whole-number multiple of an information transmission speed, and a data clock having a speed identical with the information transmission speed;

address generating means for generating an address signal based upon data, which is inputted in synchronization with the data clock, and said address clock;

memory means for outputting discrete data based upon the address signal outputted by said address generating means, in which oscillations having a plurality of mutually different frequencies are contained in said discrete data as components, and the phase of each component is determined by the value of each digit of a prescribed spread-spectrum code;

converting means for converting said discrete data into a discrete analog signal;

modulating means for modulating a carrier wave by said discrete analog signal to produce a spread-spectrum signal; and transmitting means for transmitting said modulated discrete analog signal via a transmission line.

34. A spread-spectrum signal receiving apparatus comprising:

receiving means for receiving a spread spectrum signal from a transmission line;

mixer means for converting the signal received from the transmission line into a predetermined-frequency signal;

clock regenerating means for generating a data clock and an address clock based upon an output from said mixer means;

demodulating means for reproducing original data based upon the data clock and the output of said mixer means;

address generating means for generating an address signal in synchronization with the address clock;

memory means for outputting discrete data based upon the address signal, in which oscillations having a plurality of mutually different frequencies are contained in said discrete data as components, and the phase of each component is determined by the value of each digit of a prescribed spread-spectrum code; and converting means for converting said discrete data into a discrete analog signal and outputting said discrete analog signal to said mixer means.

35. A spread-spectrum signal transmitting apparatus comprising:

clock means for generating an address clock having a speed which is a whole-number multiple of an information transmission speed, and a data clock having a speed identical with the information transmission speed;

address generating means for generating an address signal in synchronization with the address clock;

memory means for outputting discrete data based upon the address signal, in which oscillations having a plurality of mutually different frequencies are contained in said discrete data as components, and the phase of each component is determined by the value of each digit of a prescribed spread-spectrum code;

converting means for converting said discrete data into a discrete analog signal;

modulating means for performing modulation based upon data inputted in synchronization with the data clock; and mixer means for multiplying a modulated signal from said modulating means by the analog signal from said converting means, and for transmitting the product to a transmission line.

36. A spread-spectrum signal receiving apparatus comprising:

receiving means for receiving a spread-spectrum signal from a transmission line;

mixer means for converting the signal received from the transmission line into a predetermined-frequency signal;

demodulating means for reproducing a data clock based upon the predetermined-frequency signal and demodulating said data; address clock regenerating means for generating an address clock based upon the reproduced data clock;

address generating means for generating an address signal based upon the address clock;

memory means for outputting discrete data based upon the address signal, in which oscillations having a plurality of mutually different frequencies are contained in said discrete data as components, and the phase of each component is determined by the value of each digit of a prescribed spread-spectrum code; and converting means for converting said discrete data into a discrete analog signal and outputting said discrete analog signal to said mixer means.

37. A spread-spectrum signal transmitting apparatus comprising:

clock means for generating an address clock having a speed which is a whole-number multiple of an information transmission speed, and a data clock having a speed identical with the information transmission speed;

address generating means for generating an address signal in synchronization with the address clock;

memory means for outputting discrete data based upon the address signal, in which oscillations having a plurality of mutually different frequencies are contained in said discrete data as components, and displacement from the center frequency of each component is determined by the value of each digit of a prescribed spread-spectrum code;

converting means for converting said discrete data into a discrete analog signal;

modulating means for performing modulation based upon data inputted in synchronization with the data clock; and mixer means for multiplying a modulated signal from said modulating means by the discrete analog signal from said converting means, and for transmitting the product to a transmission line.

38. A spread-spectrum signal receiving apparatus comprising:

receiving means for receiving a signal from a transmission line;

mixer means for converting the signal received from the transmission line into an intermediate-frequency signal;

demodulating means for reproducing a data clock based upon the intermediate-frequency signal and demodulating said data;

address clock regenerating means for generating an address clock based upon the reproduced data clock;

address generating means for generating an address signal based upon the address clock;

memory means for outputting discrete data based upon the address signal, in which oscillations having a plurality of mutually different frequencies are contained in said discrete data as components, and displacement from a center frequency of each component is determined by the value of each digit of a prescribed spread-spectrum code; and converting means for converting said discrete data into a discrete analog signal and outputting said discrete analog signal to said mixer means.

39. A method for transmitting a spread-spectrum signal, said method comprising the steps of:

storing, as digital data, a signal having a waveform that is determined from a prescribed spread-spectrum code sequence;

generating, based upon transmission data and data stored by said storing step, the signal having the determined waveform; and transmitting the signal generated by said generating step through a transmission line.

40. The method according to claim 39, wherein said signal has a waveform obtained by combining a plurality of signals having mutually different frequencies corresponding to each digit and the value of each digit in the spread-spectrum code sequence.

41. The method according to claim 39, wherein said signal has a waveform obtained by combining a plurality of signals, which have mutually different frequencies corresponding to digits in the spread-spectrum code, upon reversing the phases of the signal in dependence upon the value of each digit.

42. The method according to claim 39, wherein said storing step stores a signal, which has been digitized at a frequency based upon a sampling theorem, as data.

43. The method according to claim 42, wherein said generating step includes the steps of:

forming an address clock having a frequency identical with that of the digitizing frequency and a data clock having a period which is a whole-number multiple of that of the address clock; and forming an address signal in synchronization with the address clock based upon transmission data input in synchronization with the data clock.

44. The method according to claim 39, wherein said generating step includes the step of converting the digital data into discrete analog data.

45. The method according to claim 40, wherein each of the plurality of signals having the mutually different frequencies has a waveform whose envelope is shaped.

46. The method according to claim 41, wherein each of the plurality of signals having the mutually different frequencies has a waveform whose envelope is shaped.

47. A method for receiving a spread-spectrum signal, said method comprising the steps of:

storing, as digital data, a signal having a waveform that is determined from a prescribed reverse spread-spectrum code sequence;

generating the signal having the determined waveform based upon said data; and demodulating data from said signal generated by said generating step and a received signal.

48. The method according to claim 47, wherein said generating step includes the steps of:

reading data which has been stored by said storing step in dependence upon the received signal;

forming the signal having the predetermined waveform based upon the data read out by said reading step;

producing a signal having a prescribed frequency; and multiplying the signal formed by said forming step by the signal having the prescribed frequency produced by said producing step.

49. The method according to claim 48, wherein said signal has a waveform obtained by combining a plurality of signals having mutually different frequencies corresponding to each digit and the value of each digit in the spread-spectrum code sequence.

50. The method according to claim 48, wherein said signal has a waveform obtained by combining a plurality of signals, which have mutually different frequencies corresponding to digits in the spread-spectrum code, upon reversing the phases of the signal in dependence upon the value of each digit.

51. The method according to claim 47, wherein said storing step stores a signal, which has been digitalized at a frequency based upon a sampling theorem, as data.

52. The method according to claim 51, wherein said generating step includes the steps of:

forming an address clock and a data clock having a period which is a whole-number multiple of that of the address clock based upon the signal, which is generated by said generating step, and the received signal; and forming an address signal in synchronization with the address clock.

53. The method according to claim 48, wherein said forming step includes the steps of:

converting the digital data into discrete analog data; and filtering the discrete analog data and performing anti-aliasing.

* * * * *

UNITED STATES PATENT AND TRADEMARK OFFICE
CERTIFICATE OF CORRECTION

PATENT NO. : 5,825,805
DATED : October 20, 1998
INVENTOR(S) : Ichiro Kato

It is certified that error appears in the above-identified patent and that said Letters Patent is hereby corrected as shown below:

On the title page: Item ]56]

Column 15, line 46, delete "determined from", insert --obtained by combining a plurality of signals each having mutually different frequency corresponding to a value of one digit in--.

Column 16, line 7, change "claim 2" to --claim 1--.

Column 16, line 25, delete "determined from", insert --obtained by combining a plurality of signals each having mutually different frequency corresponding to a value of one digit in--.

Column 17, line 13, delete "determined from", insert --obtained by combining a plurality of signals each having mutually different frequency corresponding to a value of one digit in--.

Column 17, line 62, delete "determined from", insert --obtained by combining a plurality of signals each having mutually different frequency corresponding to a value of one digit in--.

Column 21, line 43, delete "determined from", insert --obtained by combining a plurality of signals each having mutually different frequency corresponding to a value of one digit in--.

Column 22, line 20, delete "determined from", insert --obtained by combining a plurality of signals each having mutually different frequency corresponding to a value of one digit in--.

Signed and Sealed this

Twenty-seventh Day of April, 1999

*Attest:*

Q. TODD DICKINSON

*Attesting Officer*       *Acting Commissioner of Patents and Trademarks*

UNITED STATES PATENT AND TRADEMARK OFFICE
CERTIFICATE OF CORRECTION

PATENT NO. : 5,825,805
DATED : October 20, 1998
INVENTOR(S) : Ichiro Kato

It is certified that error appears in the above-identified patent and that said Letters Patent is hereby corrected as shown below:

On the title page, item[73]:

In the Assignee, change "Canon" to --Canon Kabushiki Kaisha--.

Signed and Sealed this

Thirteenth Day of July, 1999

Attest:

Q. TODD DICKINSON

Attesting Officer        Acting Commissioner of Patents and Trademarks

UNITED STATES PATENT AND TRADEMARK OFFICE
CERTIFICATE OF CORRECTION

PATENT NO. : 5,825,805
DATED : October 20, 1998
INVENTOR(S) : Ichiro Kato

It is certified that error appears in the above-indentified patent and that said Letters Patent is hereby corrected as shown below:

On the title page: Item [56] change "4,452,642" to --4,425,642--.

Column 15, line 46, delete "determined from", insert --obtained by combining a plurality of signals each having mutually different frequency corresponding to a value of one digit in--.

Column 16, line 7, change "claim 2" to --claim 1--.

Column 16, line 25, delete "determined from", insert --obtained by combining a plurality of signals each having mutually different frequency corresponding to a value of one digit in--.

Column 17, line 13, delete "determined from", insert --obtained by combining a plurality of signals each having mutually different frequency corresponding to a value of one digit in--.

Column 17, line 62, delete "determined from", insert --obtained by combining a plurality of signals each having mutually different frequency corresponding to a value of one digit in--.

UNITED STATES PATENT AND TRADEMARK OFFICE
CERTIFICATE OF CORRECTION

PATENT NO. : 5,825,805
DATED : October 20, 1998
INVENTOR(S) : Ichiro Kato

It is certified that error appears in the above-indentified patent and that said Letters Patent is hereby corrected as shown below:

Column 21, line 43, delete "determined from", insert --obtained by combining a plurality of signals each having mutually different frequency corresponding to a value of one digit in--.

Column 22, line 20, delete "determined from", insert --obtained by combining a plurality of signals each having mutually different frequency corresponding to a value of one digit in--.

This certificate supersedes Certificate of Correction issued April 27, 1999.

Signed and Sealed this

Fifth Day of October, 1999

Attest:

Q. TODD DICKINSON

*Attesting Officer*    *Acting Commissioner of Patents and Trademarks*